US012199885B2

(12) United States Patent
Wang et al.

(10) Patent No.: US 12,199,885 B2
(45) Date of Patent: *Jan. 14, 2025

(54) PROACTIVE AUTO-SCALING

(71) Applicant: International Business Machines Corporation, Armonk, NY (US)

(72) Inventors: Yi Ming Wang, Xi'an (CN); Rui Wang, Beijing (CN); Jing Bo Jiang, Beijing (CN); Yan Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,394

(22) Filed: Oct. 2, 2023

(65) Prior Publication Data
US 2024/0031305 A1   Jan. 25, 2024

Related U.S. Application Data

(63) Continuation of application No. 17/657,268, filed on Mar. 30, 2022, now Pat. No. 11,811,676.

(51) Int. Cl.
*H04L 47/78* (2022.01)
*H04L 47/70* (2022.01)
(Continued)

(52) U.S. Cl.
CPC .......... *H04L 47/781* (2013.01); *H04L 47/762* (2013.01); *H04L 47/801* (2013.01); *H04L 47/829* (2013.01)

(58) Field of Classification Search
CPC ... H04L 47/781; H04L 47/762; H04L 47/801; H04L 47/829
See application file for complete search history.

(56) References Cited

U.S. PATENT DOCUMENTS 9,547,534 B2 *   1/2017   Dettori ................. G06F 9/5072
10,374,900 B2 *   8/2019   Dujodwala ............ H04L 41/12
(Continued)

FOREIGN PATENT DOCUMENTS

CN   102013991 B   4/2011
CN   105162859 A   12/2015
(Continued)

OTHER PUBLICATIONS

"Method and system of Proactive Auto-scaling", An IP.com Prior Art Database Technical Disclosure, Disclosed Anonymously, IP.com No. IPCOM000260304D, Nov. 11, 2019, 3 pages, <https://priorart.ip.com/IPCOM/000260304>.
(Continued)

*Primary Examiner* — Joe Chacko
(74) *Attorney, Agent, or Firm* — Eric W. Chesley

(57) ABSTRACT

In an approach for proactive service group based auto-scaling, a processor collects usage data generated in one or more services in a container platform. A processor predicts access situation and resource utilization of the one or more services based on the usage data. A processor constructs a dynamic correlation topology among the one or more services based on the access situation and resource utilization. A processor identifies associated services correlated with the one or more services based on the dynamic correlation topology. A processor, in response to a service request exceeding a pre-set threshold, expands the one or more services and associated services.

14 Claims, 10 Drawing Sheets

(51) Int. Cl.
  *H04L 47/762* (2022.01)
  *H04L 47/80* (2022.01)

(56) References Cited

U.S. PATENT DOCUMENTS

| | | | | |
|---|---|---|---|---|
| 2013/0086273 A1* | 4/2013 | Wray | ................... | G06F 9/5072 |
| | | | | 709/226 |
| 2015/0113120 A1* | 4/2015 | Jacobson | ............ | H04L 43/0817 |
| | | | | 709/224 |
| 2016/0105350 A1* | 4/2016 | Greifeneder | ........ | H04L 41/5058 |
| | | | | 709/224 |
| 2016/0323187 A1 | 11/2016 | Guzman | | |
| 2017/0244607 A1* | 8/2017 | Dujodwala | ......... | H04L 41/0896 |
| 2019/0250949 A1 | 8/2019 | Chen | | |
| 2020/0204623 A1 | 6/2020 | Einkauf | | |
| 2021/0081243 A1 | 3/2021 | Jain | | |
| 2022/0321495 A1* | 10/2022 | Liu | ....................... | H04L 41/065 |

FOREIGN PATENT DOCUMENTS

| | | |
|---|---|---|
| CN | 106293868 A | 1/2017 |
| CN | 108076082 A | 5/2018 |
| CN | 114048006 A | 2/2022 |
| TW | 202207030 A | 2/2022 |
| WO | WO-2022110444 A1 * 6/2022 ......... G06F 9/45558 |

OTHER PUBLICATIONS

Bauer et al., "Chamulteon: Coordinated Auto-Scaling of Micro-Services", Proceedings of the 39th IEEE International Conference on Distributed Computing Systems (ICDCS 2019), Jul. 7-9, 2019, in Dallas, Texas, 12 pages, <https://ieeexplore.ieee.org/abstract/document/8885153>.

Garrison, Justin, "Creating Kubernetes Auto Scaling Groups for Multiple Availability Zones", Amazon Elastic Kubernetes Services, Containers, Sep. 2, 2020, 12 pages, <https://aws.amazon.com/blogs/containers/amazon-eks-cluster-multi-zone-auto-scaling-groups/>.

IBM: List of IBM Patents or Patent Applications Treated as Related. Filed Herewith. 2 pages.

International Search Report and Written Opinion dated Jun. 20, 2023 from International Application No. PCT/CN2023/083671 filed Mar. 24, 2023.

Mell et al., "The NIST Definition of Cloud Computing", National Institute of Standards and Technology, Special Publication 800-145, Sep. 2011, 7 pages.

U.S. Appl. No. 17/657,268, filed Mar. 30, 2022. This Reference is Not Attached Because It is Readily Available to the Examiner.

* cited by examiner

PROACTIVE AUTO-SCALING

BACKGROUND

The present disclosure relates generally to the field of cloud services, and more particularly to proactive service group based auto-scaling.

With the growing use of virtual resources, customers may encounter situations in which the virtual resources cannot accommodate their needs during certain situations, such as unanticipated traffic spikes or need for immediate responses to satisfy increased loads. With the number of customers of a computing platform increasing, the demands on resources provided by the computing platform are also increasing. In some examples, customers may run their applications on multiple instances across the computing platform with certain resources allocated to each instance. Each instance, for example, may include a virtual server running on a particular host machine of the computing platform, and may offer different compute and memory capabilities and resources.

Containers may be small units of application code, libraries, binaries, and dependencies. Containerization may make code portable since containers may not be directly linked to the underlying infrastructure. Thus, developers can write and execute code anywhere—on a desktop, IT environment, or in the cloud. Containers can run on a virtualized operating system. A container platform may be software tools that enable the efficient management of multiple containers running within a single operating system. A container platform may automate, govern, and orchestrate containers. A container platform may provide virtualized, isolated environments to run applications and their dependencies securely. A container platform may manage containers and the underlying infrastructure that runs the containers. A container platform may manage the entire container lifecycle including automation, scheduling, deployment, load balancing, scaling, and networking of containers. Managed container services may be cloud-based offerings that simplify the building, managing, and scaling of containerized applications by running containers on server instances, or running containers in a managed service.

SUMMARY

Certain shortcomings of the prior art are overcome, and additional advantages are provided through the provision of an approach for proactive service group based auto-scaling. Advantageously, a processor collects usage data generated in one or more services in a container platform. A processor predicts access situation and resource utilization of the one or more services based on the usage data. A processor constructs a dynamic correlation topology among the one or more services based on the access situation and resource utilization. A processor identifies associated services correlated with the one or more services based on the dynamic correlation topology. A processor, in response to a service request exceeding a pre-set threshold, expands the one or more services and associated services.

In one or more embodiments, a computer-implemented method is provided to collect usage data generated in services in a container platform. Advantageously, the usage data, for example, can be pod-level resource status of pods and service access status of services. The usage data may include service log data. Advantageously, the computer-implemented method may detect pod-level resource status of pods and service access status of services through an application programming interface (API) in the container platform. The computer-implemented method may collect service log data as data input for subsequent modules. Advantageously, the proactive auto-scaling module may calculate service level resource utilization based on a corresponding relationship between the services and the pods.

In one or more embodiments, a computer-implemented method is provided to predict access situation and resource utilization of services based on the usage data collected from the services. Advantageously, the computer-implemented method may predict service request and resource. Advantageously, the computer-implemented method may construct a long-term prediction model based on historical data by statistical analysis of the historical data from the services and the pods. The computer-implemented method may integrate the historical data and short-term real-time data to predict a future change of services. Advantageously, the computer-implemented method may take the usage data as an input to predict the access situation and resource utilization of each service. In an example, considering that the service request and resource prediction may have a certain periodicity, advantageously, the computer-implemented method may use a combination of historical long-term prediction model and short-term fitting. For example, the expected value (mean) based on the statistics of the first N windows may be used as a predicted value of the next window.

In one or more embodiments, a computer-implemented method is provided to construct a dynamic correlation topology among services based on the access situation and resource utilization of services. Advantageously, the computer-implemented method may build an initial network graph based on prior knowledge of experts. The computer-implemented method may perform statistics analysis on a node change of the initial network graph. Advantageously, the computer-implemented method may obtain the dynamic correlation topology based on similarity correlation of nodes in the initial network. The computer-implemented method may calculate a Euclidean distance between each service statistical index. Advantageously, the computer-implemented method may associate calls between services by normalizing the Euclidean distance. The computer-implemented method may achieve an expansion ratio calculation of the associated services through similarity. Advantageously, the computer-implemented method may use the correlation of nodes for modeling.

In one or more embodiments, a computer-implemented method is provided to identify associated services correlated with services based on the dynamic correlation topology generated for services. Advantageously, in response to a service request exceeding a pre-set threshold, the computer-implemented method may expand services and associated services. Advantageously, the computer-implemented method may perform a simulation according to the dynamic correlation topology to view a group of the corresponding associated services by an expert. The computer-implemented method may estimate an expansion size of the associated services according to a current node expansion. In an example, the computer-implemented method may use a service scaling controller to handle the service group scaling. When performing the capacity expansion, advantageously, the computer-implemented method may use the service association probability graph obtained by the service association dynamic detector and may use the breadth of the graph to traverse and select the service with high relevance as the service group for capacity expansion. For example, advantageously, the computer-implemented method may combine expert experience and algorithms to categorize the service group. After the establishment of the association graph is completed, the expert can perform a simulation according to the association graph to view the associated service group and can set the threshold based on the judgment. Advantageously, the computer-implemented method may carry out a dynamic expansion in advance through a service prediction. While considering an expert experience, the computer-implemented method may consider a dynamic change of a cluster to expand services. While considering the expansion of a current node, the computer-implemented method may expand the associated services together to improve the effectiveness of expansion.

In another aspect, a computer program product is provided which includes one or more computer readable storage media, and program instructions collectively stored on the one or more computer readable storage media. Advantageously, program instructions collect usage data generated in one or more services in a container platform. Program instructions predict access situation and resource utilization of the one or more services based on the usage data. Program instructions construct a dynamic correlation topology among the one or more services based on the access situation and resource utilization. Program instructions identify associated services correlated with the one or more services based on the dynamic correlation topology. Program instructions, in response to a service request exceeding a pre-set threshold, expand the one or more services and associated services.

In a further aspect, a computer system is provided which includes one or more computer processors, one or more computer readable storage media, and program instructions stored on the one or more computer readable storage media for execution by at least one of the one or more computer processors. Advantageously, program instructions collect usage data generated in one or more services in a container platform. Program instructions predict access situation and resource utilization of the one or more services based on the usage data. Program instructions construct a dynamic correlation topology among the one or more services based on the access situation and resource utilization. Program instructions identify associated services correlated with the one or more services based on the dynamic correlation topology. Program instructions, in response to a service request exceeding a pre-set threshold, expand the one or more services and associated services.

Additional features and advantages are realized through the techniques of the present invention. Other embodiments and aspects of the invention are described in detail herein and are considered a part of the claimed invention.

DETAILED DESCRIPTION

Figure 1:
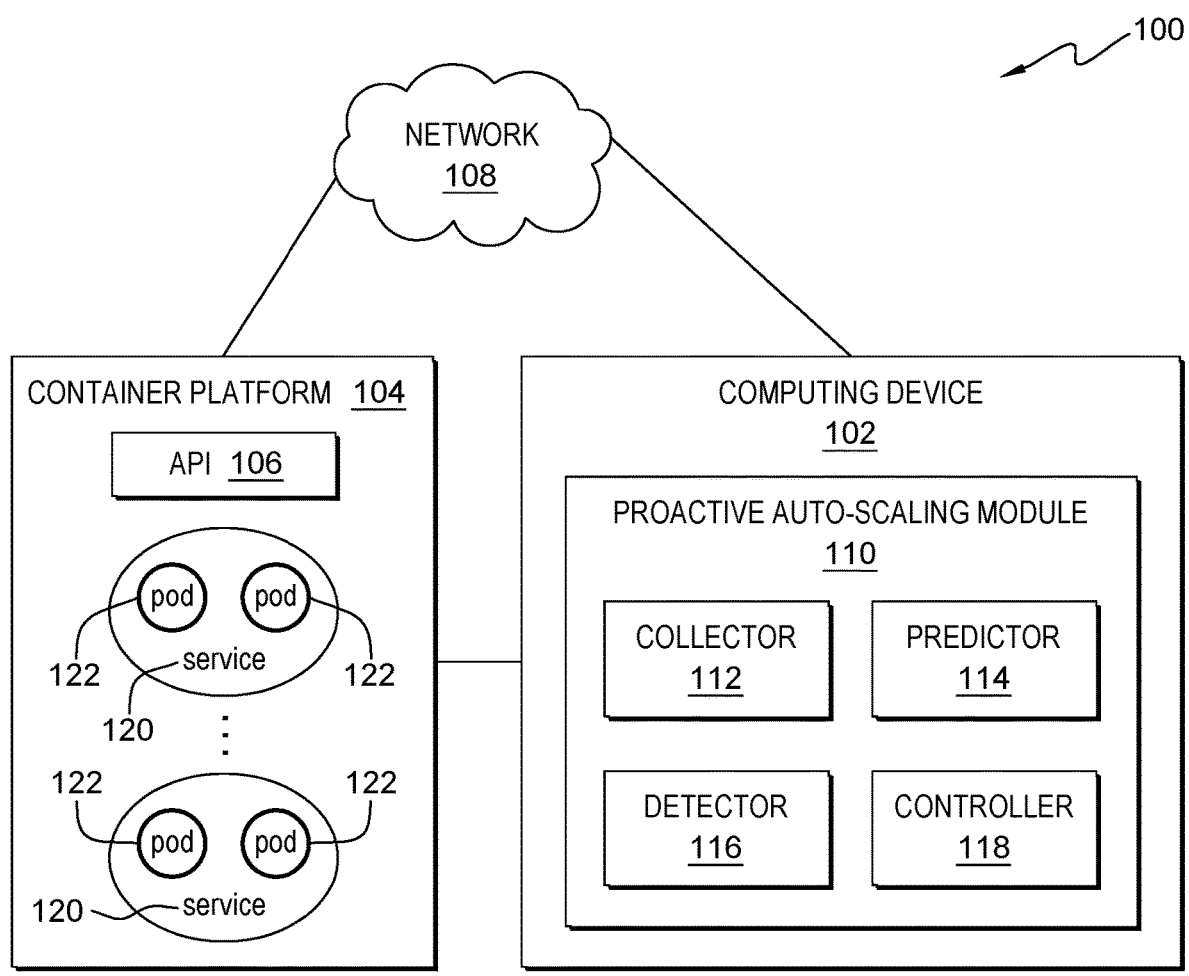
FIG. 1 is a functional block diagram illustrating an auto-scaling environment, in accordance with an embodiment of the present disclosure.

The present disclosure is directed to systems and methods for proactive service group based auto-scaling.

Embodiments of the present disclosure recognize a need for business developers to focus more on business innovation and reduce usage costs. Cloud services may provide scalability in the cloud and can effectively expand according to the access situation. Embodiments of the present disclosure recognize a need for considering the relevance of each component in the cloud services for scalability. Embodiments of the present disclosure recognize a need for performing service improvements (e.g., pod expansion) in advance to cope with a future surge in communication traffic and providing a user with a better service effect. The upstream and downstream services of some services may be delayed due to asynchronous communication.

Embodiments of the present disclosure disclose using an application programming interface (API) provided by a container platform (e.g., OpenShift® container platform (OCP)) and log information of each service to collect pod-level resource status and service access status. The corresponding relationship between service and pod may be used to obtain service-level resource utilization data. Embodiments of the present disclosure disclose taking the data obtained by a resource collection and organizer as input to predict the access situation and resource utilization of each service and predicting whether there will be an abnormal increase in the service in the future. Embodiments of the present disclosure disclose building a network graph based on the prior knowledge of experts, performing statistics on node changes based on windows, using the correlation of nodes for modeling, and obtaining similarity correlation graphs of nodes. Embodiments of the present disclosure disclose pre-setting a service threshold. When a request of a certain service is found to exceed the threshold, the expansion may be triggered. Embodiments of the present disclosure disclose using the correlation graph obtained by a service correlation topology detector to find corresponding associated services. Embodiments of the present disclosure disclose concurrently calling an OCP interface to expand the service and other related services at the same time and completing an advance expansion operation of the service group.

Embodiments of the present disclosure disclose collecting logs and resource usage information generated in a service and providing a data basis for subsequent statistical analysis. Embodiments of the present disclosure disclose an API provided by an OCP to obtain pod metrics (e.g., CPU and memory) regularly. Embodiments of the present disclosure disclose counting pod request time based on the pod's logs and obtaining an average service-level resource utilization based on correspondence between the service and the pod. Embodiments of the present disclosure disclose using combination of a historical long-term prediction model and a short-term fitting model. First, the expected value (mean) based on the statistics of the first N windows may be used as a predicted value of the next window. Embodiments of the present disclosure disclose setting a forecast period according to a specific time period. For example, when a traffic tends to increase sharply, the system may set an hourly forecast. On the daily working day, the system may forecast once a day. The system may provide manual configuration, which can modify the predicted frequency manually. At the same time, the system may use statistical analysis of historical data to obtain information on different periods of time and holidays in history to construct a long-term prediction model. Due to the sudden and infrequent nature of the expansion, the system may use short-term data before and after the expansion (e.g., a 3-days data before and after a special busy holiday) for model construction. Embodiments of the present disclosure disclose integrating historical data and short-term real-time data to predict the future changes of the service.

Embodiments of the present disclosure disclose using a service correlation topology detector to find a dynamic correlation topology. Embodiments of the present disclosure disclose constructing an initial correlation diagram of the service based on the architecture provided by a business personnel. The topological structure given by the business personnel may tend to be biased toward the system architecture. Less information may be given for the dynamic correlation call relationship between services. Embodiments of the present disclosure disclose selecting short-term data before and after the time point when the historical expansion event occurs, such as the data within three days for statistical analysis. Embodiments of the present disclosure disclose calculating the Euclidean distance between each service statistical index and associating the calls between services by normalizing the Euclidean distance. Embodiments of the present disclosure disclose using a service scaling controller to handle the service group scaling. According to the CPU and memory resource conditions of the service predicted by the service request predictor, the service scaling controller may compare with the preset threshold to determine whether the threshold is reached. The expansion may be triggered when the threshold is reached.

Embodiments of the present disclosure disclose carrying out dynamic expansion in advance through a service prediction. Embodiments of the present disclosure disclose joining the dynamic changes of the cluster to expand the service while considering expert experience. Embodiments of the present disclosure disclose expanding the associated services together to improve the effectiveness of expansion while considering the expansion of the current node. Embodiments of the present disclosure disclose using an API provided by an OCP and log information of each service to collect pod-level resource status and service access status. Embodiments of the present disclosure disclose using the corresponding relationship between a service and a pod to get the average service level resource utilization. Embodiments of the present disclosure disclose collecting service log data as data input for subsequent modules. Embodiments of the present disclosure disclose taking data obtained by a resource collection and organizer as input to predict the access situation and resource utilization of each service and predicting whether there will be an abnormal increase in the service in the future. Embodiments of the present disclosure disclose building a network graph based on the prior knowledge of experts, performing statistics on node changes based on windows, using the correlation of nodes for modeling, and obtaining similarity correlation graphs of nodes. Embodiments of the present disclosure disclose using statistical methods to analyze the system topology based on the results of the second step and giving a result of the latest topology. Embodiments of the present disclosure disclose having a service scaling controller that will pre-set the service threshold. Embodiments of the present disclosure disclose, when the request of a certain service is found to exceed the threshold, the expansion can be triggered. Embodiments of the present disclosure disclose using the correlation graph obtained by the service correlation topology detector to find its corresponding associated services. Embodiments of the present disclosure disclose concurrently calling an OCP interface to expand the service and associated services at the same time and completing the advance expansion operation of the service group.

Embodiments of the present disclosure disclose achieving robustness of the entire system by grouping all services according to the system topology and pre-expanding related services in a unified manner in the form of service groups, rather than the increase of a single service instance. Embodiments of the present disclosure disclose using a network topology and real-time monitoring data to automatically group each service in the system. Embodiments of the present disclosure disclose predicting the future service traffic and performing expansion processing in advance. Embodiments of the present disclosure disclose using the dynamic analysis of the topology to group the services of the system, as well as the traffic prediction through the analysis of historical data and real-time monitoring data, so as to perform the pre-expansion of multiple instance groups of multiple services. Embodiments of the present disclosure disclose discovering the association between business service instances in the user's business system and automatically performing service grouping and instance pre-expansion to ensure the robustness of the business system.

The present disclosure will now be described in detail with reference to the Figures. FIG. 1 is a functional block diagram illustrating an auto-scaling environment, generally designated 100, in accordance with an embodiment of the present disclosure.

In the depicted embodiment, auto-scaling environment 100 includes computing device 102, container platform 104, and network 108. In various embodiments of the present disclosure, container platform 104 can be a platform as a service which can include cloud computing services that allow customers to provision, instantiate, run, and manage a modular bundle comprising a computing platform and one or more applications. Container platform 104 may allow developers to create, develop, and package such software bundles without the complexity of building and maintaining the infrastructure typically associated with developing and launching the application(s). In an example, container platform 104 can be an OpenShift® container platform (OCP). In other examples, container platform 104 can be any other suitable computing platform. In the depicted embodiment, container platform 104 includes application programming interface (API) 106 and service(s) 120. Service(s) 120 may include pod(s) 122. In an example, API 106 may be a set of functions, procedures, methods or classes used by computer programs to request services from the operating system, software libraries or any other service providers running on the computer. API 106 may be a connection between computers or between computer programs. In an example, service(s) 120 can serve as an internal load balancer. Service(s) 120 may identify a set of replicated pods 122 in order to proxy the connections service(s) 120 receives to pods 122. Backing pods can be added to or removed from a service arbitrarily while service(s) 120 remain consistently available, enabling anything that depends on service(s) 120 to refer to service(s) 120 at a consistent address. In an example, pod(s) 122 can be one or more containers deployed together on one host. Pod(s) 122 can be the smallest compute unit that can be defined, deployed, and managed. For example, pods 122 may be a rough equivalent of a machine instance (physical or virtual) to a container. Each pod may be allocated its own internal IP address, therefore owning its entire port space, and containers within pods 122 can share their local storage and networking. Pods 122 may have a lifecycle. Pods 122 may be defined and assigned to run on a node. Pods 122 may run until their container(s) exit or pods 122 may be removed for some other reason. Pods 122, depending on policy and exit code, may be removed after exiting, or may be retained in order to enable access to the logs of their containers.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to proactive auto-scaling module 110 and network 108 and is capable of processing program instructions and executing proactive auto-scaling module 110, in accordance with an embodiment of the present disclosure. Computing device 102 may include internal and external hardware components, as depicted and described in further detail with respect to FIG. 8.

Further, in the depicted embodiment, computing device 102 includes proactive auto-scaling module 110. In the depicted embodiment, proactive auto-scaling module 110 is located on computing device 102. In some embodiments, proactive auto-scaling module 110 may be located on container platform 104. In some embodiments, proactive auto-scaling module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and proactive auto-scaling module 110, in accordance with a desired embodiment of the disclosure.

In one or more embodiments, proactive auto-scaling module 110 is configured to collect usage data generated in services 120 in container platform 104. The usage data, for example, can be pod-level resource status of pods 122 and service access status of services 120. The usage data may include service log data. Proactive auto-scaling module 110 may detect pod-level resource status of pods 122 and service access status of services 120 through API 106 in container platform 104. Proactive auto-scaling module 110 may collect service log data as data input for subsequent modules. Proactive auto-scaling module 110 may calculate service level resource utilization based on a corresponding relationship between services 120 and pods 122. Proactive auto-scaling module 110 may use API provided by container platform 104 (e.g., OpenShift® container platform) and the log information of each service 120 to collect pod-level resource status and service access status. Proactive auto-scaling module 110 may use the corresponding relationship between services 120 and pods 122 to obtain the average service-level resource utilization. Proactive auto-scaling module 110 may collect logs and resource usage information generated in services 120. Proactive auto-scaling module 110 may provide a data basis from the logs and resource usage information for subsequent statistical analysis steps. Proactive auto-scaling module 110 may use API 106 provided by container platform 104 to obtain pod metrics (e.g., CPU and memory) regularly. Proactive auto-scaling module 110 may count pod request time based on the pod's logs. Proactive auto-scaling module 110 may obtain the average service-level resource utilization based on the correspondence between services 120 and pods 122.

In one or more embodiments, proactive auto-scaling module 110 is configured to predict access situation and resource utilization of services 120 based on the usage data collected from services 120. Proactive auto-scaling module 110 may predict service request and resource. Proactive auto-scaling module 110 may construct a long-term prediction model based on historical data by statistical analysis of the historical data from services 120 and pods 122. Proactive auto-scaling module 110 may integrate the historical data and short-term real-time data to predict a future change of services 120. Proactive auto-scaling module 110 may take the usage data as an input to predict the access situation and resource utilization of each service 120. Proactive auto-scaling module 110 may predict whether there will be an abnormal usage increase in services 120 in the future. In an example, considering that the service request and resource prediction may have a certain periodicity, proactive auto-scaling module 110 may use a combination of historical long-term prediction model and short-term fitting. For example, first, the expected value (mean) based on the statistics of the first N windows may be used as a predicted value of the next window. Proactive auto-scaling module 110 may set a forecast period according to a specific period. For example, in a busy holiday season, when the online traffic tends to increase sharply, proactive auto-scaling module 110 may set an hourly forecast. On a regular day, proactive auto-scaling module 110 may forecast once a day. Proactive auto-scaling module 110 may also provide a manual configuration option, which can modify the predicted frequency manually. At the same time, proactive auto-scaling module 110 may use statistical analysis of historical data to obtain information on different periods of time and holidays in history to construct a long-term prediction model. However, due to the sudden and infrequent nature of the expansion, proactive auto-scaling module 110 may use short-term data before and after the expansion (such as three days data before and after a special holiday, e.g., when users tend to use internet services sharply) for model construction. Proactive auto-scaling module 110 may integrate historical data and short-term real-time data to predict the future changes of services 120.

In one or more embodiments, proactive auto-scaling module 110 is configured to construct a dynamic correlation topology among services 120 based on the access situation and resource utilization of services 120. Proactive auto-scaling module 110 may build an initial network graph based on prior knowledge of experts. Proactive auto-scaling module 110 may perform statistics analysis on a node change of the initial network graph. Proactive auto-scaling module 110 may obtain the dynamic correlation topology based on similarity correlation of nodes in the initial network. Proactive auto-scaling module 110 may select short-term data before and after a time point when a historical expansion event occurs. Proactive auto-scaling module 110 may calculate a Euclidean distance between each service statistical index. Proactive auto-scaling module 110 may associate calls between services 120 by normalizing the Euclidean distance. Proactive auto-scaling module 110 may achieve an expansion ratio calculation of the associated services through similarity. Proactive auto-scaling module 110 may build a network graph based on the prior knowledge of experts. Proactive auto-scaling module 110 may perform statistics on node changes based on windows. Proactive auto-scaling module 110 may use the correlation of nodes for modeling. Proactive auto-scaling module 110 may obtain similarity correlation graphs of nodes. Proactive auto-scaling module 110 may use a service correlation topology detector to find the dynamic correlation topology. Proactive auto-scaling module 110 may construct the initial correlation diagram of services 120 based on an architecture provided by, for example, business personnel. In some cases, the topological structure given by the business personnel may tend to be biased toward the system architecture. Less information may be given for the dynamic correlation call relationship between services 120. At the same time, considering a sudden or infrequent situation during expansion, proactive auto-scaling module 110 may select the short-term data before and after the time point when the historical expansion event occurs, for example, the data within three days for statistical analysis. Proactive auto-scaling module 110 may calculate the Euclidean distance between each service statistical index. Proactive auto-scaling module 110 may associate the calls between services by normalizing the Euclidean distance. Through the similarity to achieve the expansion ratio calculation of the associated service, proactive auto-scaling module 110 may provide guidance for the expansion of the next module.

In one or more embodiments, proactive auto-scaling module 110 is configured to identify associated services correlated with services 120 based on the dynamic correlation topology generated for service 120. In response to a service request exceeding a pre-set threshold, proactive auto-scaling module 110 may expand services 120 and associated services at the same time. Proactive auto-scaling module 110 may use the dynamic correlation topology to find the corresponding associated services with services 120. Proactive auto-scaling module 110 may perform a simulation according to the dynamic correlation topology to view a group of the corresponding associated services by an expert. Proactive auto-scaling module 110 may set a threshold based on judgment from the expert. Proactive auto-scaling module 110 may estimate an expansion size of the associated services according to a current node expansion. Proactive auto-scaling module 110 may compare the service request to the preset threshold to determine whether the preset threshold is reached. Proactive auto-scaling module 110 may trigger the expansion when the threshold is reached. Proactive auto-scaling module 110 may determine services 120 with high relevance as a service group for capacity expansion based on the dynamic correlation topology and a breadth of the dynamic correlation topology. Proactive auto-scaling module 110 may concurrently call API 106 to expand services and associated services 120 at the same time to complete the advance expansion operation of the service group. In an example, proactive auto-scaling module 110 may pre-set the service threshold. When the request of a certain service is found to exceed the threshold, proactive auto-scaling module 110 may trigger the expansion. Proactive auto-scaling module 110 may use the correlation graph obtained by the service correlation topology detector to find its corresponding associated services. Proactive auto-scaling module 110 may concurrently call an OCP interface (e.g., API 106) to expand the service and related services at the same time and to complete the advance expansion operation of the service group.

In an example, proactive auto-scaling module 110 may use a service scaling controller to handle the service group scaling. For example, based on CPU and memory resource conditions of the service predicted by proactive auto-scaling module 110, proactive auto-scaling module 110 may compare the service request with the preset threshold to determine whether the threshold is reached. Proactive auto-scaling module 110 may trigger the expansion when the threshold is reached. When performing the capacity expansion, proactive auto-scaling module 110 may use the service association probability graph obtained by the service association dynamic detector and may use the breadth of the graph to traverse and select the service with high relevance as the service group for capacity expansion. For example, proactive auto-scaling module 110 may combine expert experience and algorithms to categorize the service group. After the establishment of the association graph is completed, the expert can perform a simulation according to the association graph to view the associated service group and can set the threshold based on the judgment. For example, when the similarity reaches a certain similarity value, e.g., 0.8, proactive auto-scaling module 110 may put the associated service into a same group. When the association group is determined, proactive auto-scaling module 110 may estimate the expansion size of the associated service according to the current node expansion.

In an example, proactive auto-scaling module 110 may carry out a dynamic expansion in advance through a service prediction. While considering an expert experience, proactive auto-scaling module 110 may consider a dynamic change of a cluster to expand services 120. While considering the expansion of a current node, proactive auto-scaling module 110 may expand the associated services together to improve the effectiveness of expansion. Proactive auto-scaling module 110 may adjust the scale of the cluster based on the active situation. Proactive auto-scaling module 110 may group all services according to the system topology and pre-expanding related services in a unified manner in the form of service groups. Proactive auto-scaling module 110 may utilize network topology and real-time monitoring data to automatically group each service in the system. Proactive auto-scaling module 110 may predict the future service traffic and may perform expansion processing in advance. Proactive auto-scaling module 110 may expand a series of related service groups in advance. Proactive auto-scaling module 110 may perform the dynamic analysis of the topology to group the services of the system, as well as the traffic prediction through the analysis of historical data and real-time monitoring data. Proactive auto-scaling module 110 may perform a pre-expansion of multiple instance groups of multiple services. Proactive auto-scaling module 110 may discover the association between business service instances in the user's business system and may automatically perform service grouping and instance pre-expansion to ensure the robustness of the business system. Proactive auto-scaling module 110 may use real-time monitoring data to discover the associated topology between various business service instances in the user's business system and may automatically perform service grouping and instance pre-expansion based on the network topology to ensure the robustness of the business system. Proactive auto-scaling module 110 may automatically group the business systems according to the network topology and may perform unified expansion based on the service group.

In the depicted embodiment, proactive auto-scaling module 110 includes collector 112, predictor 114, detector 116 and controller 118. In the depicted embodiment, collector 112, predictor 114, detector 116 and controller 118 are located on computing device 102 and proactive auto-scaling module 110. In some embodiments, collector 112, predictor 114, detector 116 and controller 118 may be located on container platform 104. In some embodiments, collector 112, predictor 114, detector 116 and controller 118 may be located externally and accessed through a communication network such as network 108.

In one or more embodiments, collector 112 is configured to collect usage data generated in services 120 in container platform 104. The usage data, for example, can be pod-level resource status of pods 122 and service access status of services 120. The usage data may include service log data. Collector 112 may detect pod-level resource status of pods 122 and service access status of services 120 through API 106 in container platform 104. Collector 112 may collect service log data as data input for subsequent modules. Collector 112 may calculate service level resource utilization based on a corresponding relationship between services 120 and pods 122. Collector 112 may use API provided by container platform 104 (e.g., OpenShift® container platform) and the log information of each service 120 to collect pod-level resource status and service access status. Collector 112 may use the corresponding relationship between services 120 and pods 122 to obtain the average service-level resource utilization. Collector 112 may collect logs and resource usage information generated in services 120. Collector 112 may provide a data basis from the logs and resource usage information for subsequent statistical analysis steps. Collector 112 may use API 106 provided by container platform 104 to obtain pod metrics (e.g., CPU and memory) regularly. Collector 112 may count pod request time based on the pod's logs. Collector 112 may obtain the average service-level resource utilization based on the correspondence between services 120 and pods 122.

In one or more embodiments, predictor 114 is configured to predict access situation and resource utilization of services 120 based on the usage data collected from services 120. Predictor 114 may predict service request and resource. Predictor 114 may construct a long-term prediction model based on historical data by statistical analysis of the historical data from services 120 and pods 122. Predictor 114 may integrate the historical data and short-term real-time data to predict a future change of services 120. Predictor 114 may take the usage data as an input to predict the access situation and resource utilization of each service 120. Predictor 114 may predict whether there will be an abnormal usage increase in services 120 in the future. In an example, considering that the service request and resource prediction may have a certain periodicity, predictor 114 may use a combination of historical long-term prediction model and short-term fitting. For example, first, the expected value (mean) based on the statistics of the first N windows may be used as a predicted value of the next window. Predictor 114 may set a forecast period according to a specific period. For example, in a busy holiday season, when the online traffic tends to increase sharply, predictor 114 may set an hourly forecast. On a regular day, predictor 114 may forecast once a day. Predictor 114 may also provide a manual configuration option, which can modify the predicted frequency manually. At the same time, predictor 114 may use statistical analysis of historical data to obtain information on different periods of time and holidays in history to construct a long-term prediction model. However, due to the sudden and infrequent nature of the expansion, predictor 114 may use short-term data before and after the expansion (such as three days data before and after a special holiday, e.g., when users tend to use internet services sharply) for model construction. Predictor 114 may integrate historical data and short-term real-time data to predict the future changes of services 120.

In one or more embodiments, detector 116 is configured to construct a dynamic correlation topology among services 120 based on the access situation and resource utilization of services 120. Detector 116 may build an initial network graph based on prior knowledge of experts. Detector 116 may perform statistics analysis on a node change of the initial network graph. Detector 116 may obtain the dynamic correlation topology based on similarity correlation of nodes in the initial network. Detector 116 may select short-term data before and after a time point when a historical expansion event occurs. Detector 116 may calculate an Euclidean distance between each service statistical index. Detector 116 may associate calls between services 120 by normalizing the Euclidean distance. Detector 116 may achieve an expansion ratio calculation of the associated services through similarity. Detector 116 may build a network graph based on the prior knowledge of experts. Detector 116 may perform statistics on node changes based on windows. Detector 116 may use the correlation of nodes for modeling. Detector 116 may obtain similarity correlation graphs of nodes. Detector 116 may use a service correlation topology detector to find the dynamic correlation topology. Detector 116 may construct the initial correlation diagram of services 120 based on an architecture provided by, for example, business personnel. In some cases, the topological structure given by the business personnel may tend to be biased toward the system architecture. Less information may be given for the dynamic correlation call relationship between services 120. At the same time, considering a sudden or infrequent situation during expansion, detector 116 may select the short-term data before and after the time point when the historical expansion event occurs, for example, the data within three days for statistical analysis. Detector 116 may calculate the Euclidean distance between each service statistical index. Detector 116 may associate the calls between services by normalizing the Euclidean distance. Through the similarity to achieve the expansion ratio calculation of the associated service, detector 116 may provide guidance for the expansion of the next module.

In one or more embodiments, controller 118 is configured to identify associated services correlated with services 120 based on the dynamic correlation topology generated for service 120. In response to a service request exceeding a pre-set threshold, controller 118 may expand services 120 and associated services at the same time. Controller 118 may use the dynamic correlation topology to find the corresponding associated services with services 120. Controller 118 may perform a simulation according to the dynamic correlation topology to view a group of the corresponding associated services by an expert. Controller 118 may set a threshold based on judgment from the expert. Controller 118 may estimate an expansion size of the associated services according to a current node expansion. Controller 118 may compare the service request to the preset threshold to determine whether the preset threshold is reached. Controller 118 may trigger the expansion when the threshold is reached. Controller 118 may determine services 120 with high relevance as a service group for capacity expansion based on the dynamic correlation topology and a breadth of the dynamic correlation topology. Controller 118 may concurrently call API 106 to expand services and associated services 120 at the same time to complete the advance expansion operation of the service group. In an example, controller 118 may pre-set the service threshold. When the request of a certain service is found to exceed the threshold, controller 118 may trigger the expansion. Controller 118 may use the correlation graph obtained by the service correlation topology detector to find its corresponding associated services. Controller 118 may concurrently call an OCP interface (e.g., API 106) to expand the service and related services at the same time and to complete the advance expansion operation of the service group.

In an example, controller 118 may use a service scaling controller to handle the service group scaling. For example, based on CPU and memory resource conditions of the service predicted by controller 118, controller 118 may compare the service request with the preset threshold to determine whether the threshold is reached. Controller 118 may trigger the expansion when the threshold is reached. When performing the capacity expansion, controller 118 may use the service association probability graph obtained by the service association dynamic detector and may use the breadth of the graph to traverse and select the service with high relevance as the service group for capacity expansion. For example, controller 118 may combine expert experience and algorithms to categorize the service group. After the establishment of the association graph is completed, the expert can perform a simulation according to the association graph to view the associated service group and can set the threshold based on the judgment. For example, when the similarity reaches a certain similarity value, e.g., 0.8, controller 118 may put the associated service into a same group. When the association group is determined, controller 118 may estimate the expansion size of the associated service according to the current node expansion.

In an example, controller 118 may carry out a dynamic expansion in advance through a service prediction. While considering an expert experience, controller 118 may consider a dynamic change of a cluster to expand services 120. While considering the expansion of a current node, controller 118 may expand the associated services together to improve the effectiveness of expansion. Controller 118 may adjust the scale of the cluster based on the active situation. Controller 118 may group all services according to the system topology and pre-expanding related services in a unified manner in the form of service groups. Controller 118 may utilize network topology and real-time monitoring data to automatically group each service in the system. Controller 118 may predict the future service traffic and may perform expansion processing in advance. Controller 118 may expand a series of related service groups in advance. Controller 118 may perform the dynamic analysis of the topology to group the services of the system, as well as the traffic prediction through the analysis of historical data and real-time monitoring data. Controller 118 may perform a pre-expansion of multiple instance groups of multiple services. Controller 118 may discover the association between business service instances in the user's business system and may automatically perform service grouping and instance pre-expansion to ensure the robustness of the business system. Controller 118 may use real-time monitoring data to discover the associated topology between various business service instances in the user's business system and may automatically perform service grouping and instance pre-expansion based on the network topology to ensure the robustness of the business system. Controller 118 may automatically group the business systems according to the network topology and may perform unified expansion based on the service group.

Figure 2:
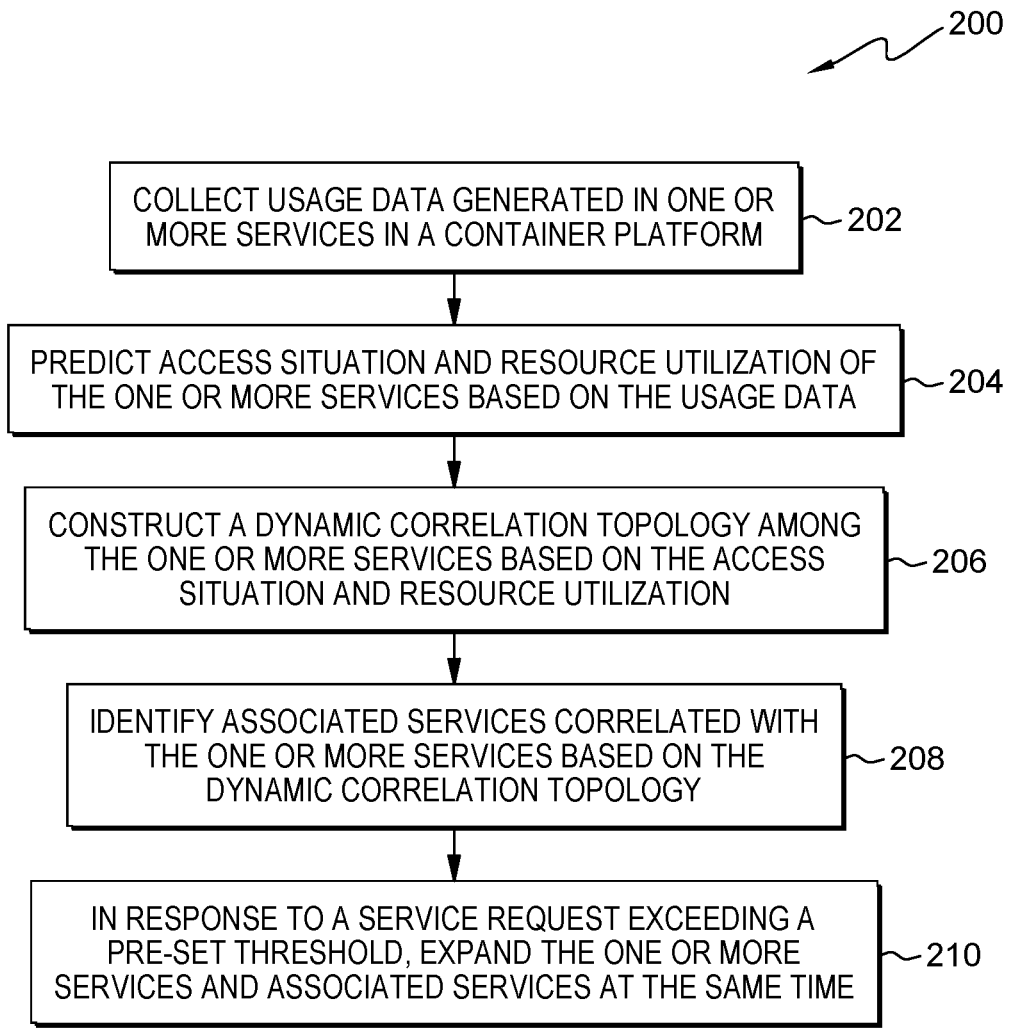
FIG. 2 is a flowchart depicting operational steps of a proactive auto-scaling module within a computing device of FIG. 1, in accordance with an embodiment of the present disclosure.

FIG. 2 is a flowchart 200 depicting operational steps of proactive auto-scaling module 110 in accordance with an embodiment of the present disclosure.

Proactive auto-scaling module 110 operates to collect usage data generated in services 120 in container platform 104. Proactive auto-scaling module 110 operates to predict access situation and resource utilization of services 120 based on the usage data. Proactive auto-scaling module 110 operates to construct a dynamic correlation topology among services 120 based on the access situation and resource utilization. Proactive auto-scaling module 110 operates to identify associated services correlated with services 120 based on the dynamic correlation topology. Proactive auto-scaling module 110 operates to, in response to a service request exceeding a pre-set threshold, expand services 120 and associated services.

In step 202, proactive auto-scaling module 110 collects usage data generated in services 120 in container platform 104. The usage data, for example, can be pod-level resource status of pods 122 and service access status of services 120. The usage data may include service log data. Proactive auto-scaling module 110 may detect pod-level resource status of pods 122 and service access status of services 120 through API 106 in container platform 104. Proactive auto-scaling module 110 may collect service log data as data input for subsequent modules. Proactive auto-scaling module 110 may calculate service level resource utilization based on a corresponding relationship between services 120 and pods 122. Proactive auto-scaling module 110 may use API provided by container platform 104 (e.g., OpenShift® container platform) and the log information of each service 120 to collect pod-level resource status and service access status. Proactive auto-scaling module 110 may use the corresponding relationship between services 120 and pods 122 to obtain the average service-level resource utilization. Proactive auto-scaling module 110 may collect logs and resource usage information generated in services 120. Proactive auto-scaling module 110 may provide a data basis from the logs and resource usage information for subsequent statistical analysis steps. Proactive auto-scaling module 110 may use API 106 provided by container platform 104 to obtain pod metrics (e.g., CPU and memory) regularly. Proactive auto-scaling module 110 may count pod request time based on the pod's logs. Proactive auto-scaling module 110 may obtain the average service-level resource utilization based on the correspondence between services 120 and pods 122.

In step 204, proactive auto-scaling module 110 predicts access situation and resource utilization of services 120 based on the usage data collected from services 120. Proactive auto-scaling module 110 may predict service request and resource. Proactive auto-scaling module 110 may construct a long-term prediction model based on historical data by statistical analysis of the historical data from services 120 and pods 122. Proactive auto-scaling module 110 may integrate the historical data and short-term real-time data to predict a future change of services 120. Proactive auto-scaling module 110 may take the usage data as an input to predict the access situation and resource utilization of each service 120. Proactive auto-scaling module 110 may predict whether there will be an abnormal usage increase in services 120 in the future. In an example, considering that the service request and resource prediction may have a certain periodicity, proactive auto-scaling module 110 may use a combination of historical long-term prediction model and short-term fitting. For example, first, the expected value (mean) based on the statistics of the first N windows may be used as a predicted value of the next window. Proactive auto-scaling module 110 may set a forecast period according to a specific period. For example, in a busy holiday season, when the online traffic tends to increase sharply, proactive auto-scaling module 110 may set an hourly forecast. On a regular day, proactive auto-scaling module 110 may forecast once a day. Proactive auto-scaling module 110 may also provide a manual configuration option, which can modify the predicted frequency manually. At the same time, proactive auto-scaling module 110 may use statistical analysis of historical data to obtain information on different periods of time and holidays in history to construct a long-term prediction model. However, due to the sudden and infrequent nature of the expansion, proactive auto-scaling module 110 may use short-term data before and after the expansion (such as three days data before and after a special holiday, e.g., when users tend to use internet services sharply) for model construction. Proactive auto-scaling module 110 may integrate historical data and short-term real-time data to predict the future changes of services 120.

In step 206, proactive auto-scaling module 110 constructs a dynamic correlation topology among services 120 based on the access situation and resource utilization of services 120. Proactive auto-scaling module 110 may build an initial network graph based on prior knowledge of experts. Proactive auto-scaling module 110 may perform statistics analysis on a node change of the initial network graph. Proactive auto-scaling module 110 may obtain the dynamic correlation topology based on similarity correlation of nodes in the initial network. Proactive auto-scaling module 110 may select short-term data before and after a time point when a historical expansion event occurs. Proactive auto-scaling module 110 may calculate an Euclidean distance between each service statistical index. Proactive auto-scaling module 110 may associate calls between services 120 by normalizing the Euclidean distance. Proactive auto-scaling module 110 may achieve an expansion ratio calculation of the associated services through similarity. Proactive auto-scaling module 110 may build a network graph based on the prior knowledge of experts. Proactive auto-scaling module 110 may perform statistics on node changes based on windows. Proactive auto-scaling module 110 may use the correlation of nodes for modeling. Proactive auto-scaling module 110 may obtain similarity correlation graphs of nodes. Proactive auto-scaling module 110 may use a service correlation topology detector to find the dynamic correlation topology. Proactive auto-scaling module 110 may construct the initial correlation diagram of services 120 based on an architecture provided by, for example, business personnel. In some cases, the topological structure given by the business personnel may tend to be biased toward the system architecture. Less information may be given for the dynamic correlation call relationship between services 120. At the same time, considering a sudden or infrequent situation during expansion, proactive auto-scaling module 110 may select the short-term data before and after the time point when the historical expansion event occurs, for example, the data within three days for statistical analysis. Proactive auto-scaling module 110 may calculate the Euclidean distance between each service statistical index. Proactive auto-scaling module 110 may associate the calls between services by normalizing the Euclidean distance. Through the similarity to achieve the expansion ratio calculation of the associated service, proactive auto-scaling module 110 may provide guidance for the expansion of the next module.

In step 208, proactive auto-scaling module 110 identifies associated services correlated with services 120 based on the dynamic correlation topology generated for service 120. Proactive auto-scaling module 110 may use the dynamic correlation topology to find the corresponding associated services with services 120. Proactive auto-scaling module 110 may perform a simulation according to the dynamic correlation topology to view a group of the corresponding associated services by an expert. Proactive auto-scaling module 110 may set a threshold based on judgment from the expert. Proactive auto-scaling module 110 may estimate an expansion size of the associated services according to a current node expansion. Proactive auto-scaling module 110 may determine services 120 with high relevance as a service group for capacity expansion based on the dynamic correlation topology and a breadth of the dynamic correlation topology. Proactive auto-scaling module 110 may use the correlation graph obtained by the service correlation topology detector to find its corresponding associated services. In an example, proactive auto-scaling module 110 may use a service scaling controller to handle the service group scaling. When performing the capacity expansion, proactive auto-scaling module 110 may use the service association probability graph obtained by the service association dynamic detector and may use the breadth of the graph to traverse and select the service with high relevance as the service group for capacity expansion. For example, proactive auto-scaling module 110 may combine expert experience and algorithms to categorize the service group. After the establishment of the association graph is completed, the expert can perform a simulation according to the association graph to view the associated service group and can set the threshold based on the judgment. For example, when the similarity reaches a certain similarity value, e.g., 0.8, proactive auto-scaling module 110 may put the associated service into a same group. When the association group is determined, proactive auto-scaling module 110 may estimate the expansion size of the associated service according to the current node expansion.

In step 210, proactive auto-scaling module 110 expands services 120 and associated services at the same time when a service request exceeds a pre-set threshold. Proactive auto-scaling module 110 may set a threshold based on judgment from the expert. Proactive auto-scaling module 110 may estimate an expansion size of the associated services according to a current node expansion. Proactive auto-scaling module 110 may compare the service request to the preset threshold to determine whether the preset threshold is reached. Proactive auto-scaling module 110 may trigger the expansion when the threshold is reached. Proactive auto-scaling module 110 may determine services 120 with high relevance as a service group for capacity expansion based on the dynamic correlation topology and a breadth of the dynamic correlation topology. Proactive auto-scaling module 110 may concurrently call API 106 to expand services and associated services 120 at the same time to complete the advance expansion operation of the service group. In an example, proactive auto-scaling module 110 may pre-set the service threshold. When the request of a certain service is found to exceed the threshold, proactive auto-scaling module 110 may trigger the expansion. In an example, proactive auto-scaling module 110 may use a service scaling controller to handle the service group scaling. For example, based on CPU and memory resource conditions of the service predicted by proactive auto-scaling module 110, proactive auto-scaling module 110 may compare the service request with the preset threshold to determine whether the threshold is reached. Proactive auto-scaling module 110 may trigger the expansion when the threshold is reached. When performing the capacity expansion, proactive auto-scaling module 110 may use the service association probability graph obtained by the service association dynamic detector and may use the breadth of the graph to traverse and select the service with high relevance as the service group for capacity expansion. For example, proactive auto-scaling module 110 may combine expert experience and algorithms to categorize the service group. After the establishment of the association graph is completed, the expert can perform a simulation according to the association graph to view the associated service group and can set the threshold based on the judgment. For example, when the similarity reaches a certain similarity value, e.g., 0.8, proactive auto-scaling module 110 may put the associated service into a same group. When the association group is determined, proactive auto-scaling module 110 may estimate the expansion size of the associated service according to the current node expansion.

In an example, proactive auto-scaling module 110 may carry out a dynamic expansion in advance through a service prediction. While considering an expert experience, proactive auto-scaling module 110 may consider a dynamic change of a cluster to expand services 120. While considering the expansion of a current node, proactive auto-scaling module 110 may expand the associated services together to improve the effectiveness of expansion. Proactive auto-scaling module 110 may adjust the scale of the cluster based on the active situation. Proactive auto-scaling module 110 may group all services according to the system topology and pre-expanding related services in a unified manner in the form of service groups. Proactive auto-scaling module 110 may utilize network topology and real-time monitoring data to automatically group each service in the system. Proactive auto-scaling module 110 may predict the future service traffic and may perform expansion processing in advance. Proactive auto-scaling module 110 may expand a series of related service groups in advance. Proactive auto-scaling module 110 may perform the dynamic analysis of the topology to group the services of the system, as well as the traffic prediction through the analysis of historical data and real-time monitoring data. Proactive auto-scaling module 110 may perform a pre-expansion of multiple instance groups of multiple services. Proactive auto-scaling module 110 may discover the association between business service instances in the user's business system and may automatically perform service grouping and instance pre-expansion to ensure the robustness of the business system. Proactive auto-scaling module 110 may use real-time monitoring data to discover the associated topology between various business service instances in the user's business system and may automatically perform service grouping and instance pre-expansion based on the network topology to ensure the robustness of the business system. Proactive auto-scaling module 110 may automatically group the business systems according to the network topology and may perform unified expansion based on the service group.

Figure 3:
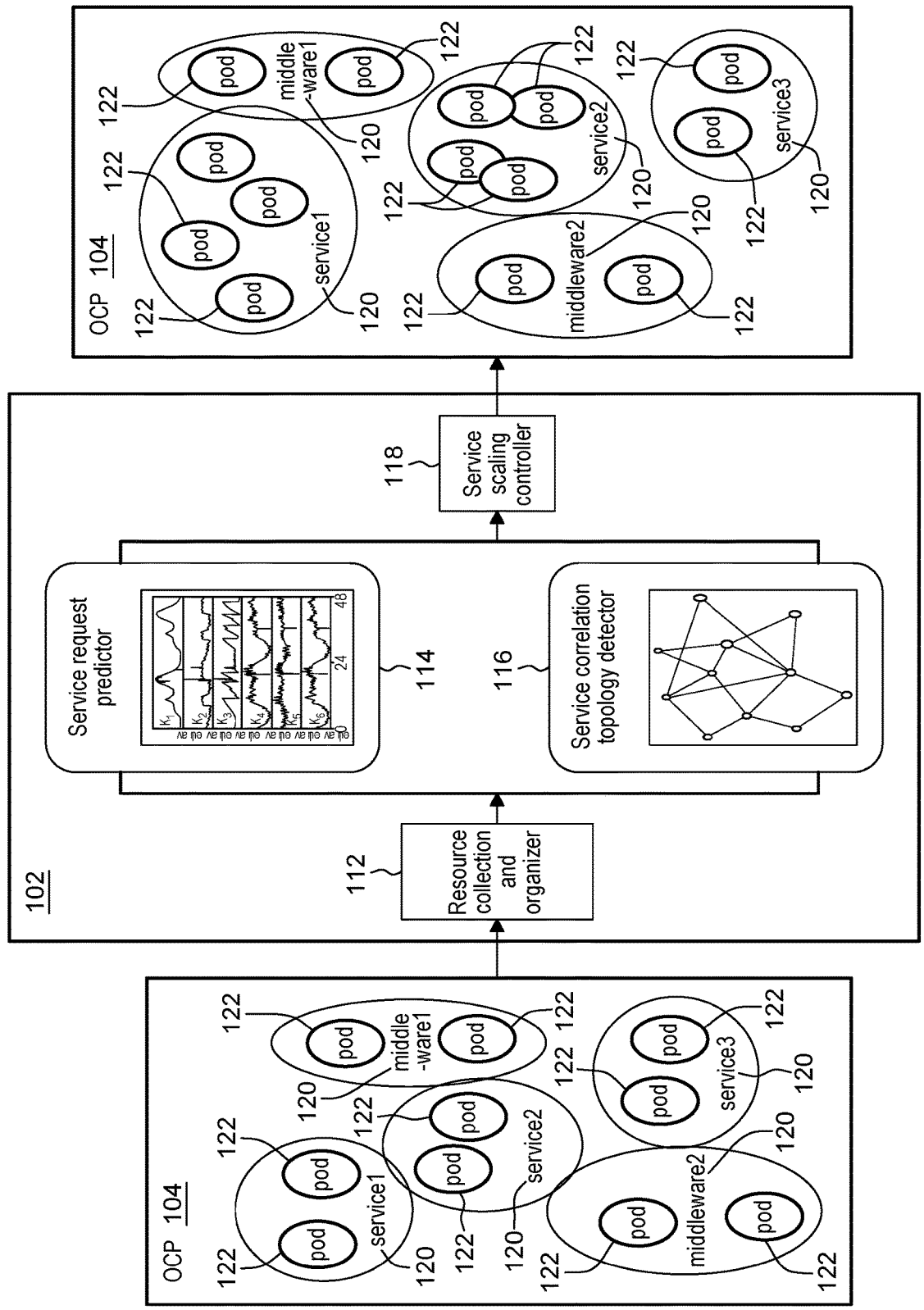
FIG. 3 illustrates an exemplary functional diagram of the proactive auto-scaling module within the computing device of FIG. 1, in accordance with an embodiment of the present disclosure.

FIG. 3 illustrates an exemplary functional diagram of proactive auto-scaling module 110, in accordance with an embodiment of the present disclosure.

In the example of FIG. 3, proactive auto-scaling module 110 includes collector 112 (e.g., resource collection and organizer), predictor 114 (e.g., service request predictor), detector 116 (e.g., service correlation topology detector) and controller 118 (e.g., service scaling controller). Collector 112 may collect usage data generated in services 120 (e.g., "service1", "service2", "service3", "middleware1", "middleware2") in container platform 104 (e.g., OCP). The usage data, for example, can be pod-level resource status of pods 122 and service access status of services 120. Collector 112 may detect pod-level resource status of pods 122 and service access status of services 120 through API 106 in container platform 104. Collector 112 may collect service log data as data input for subsequent modules (e.g., predictor 114 and detector 116). Predictor 114 may predict access situation and resource utilization of services 120 based on the usage data collected from services 120. Predictor 114 may construct a long-term prediction model based on historical data by statistical analysis of the historical data from services 120 and pods 122. Predictor 114 may integrate the historical data and short-term real-time data to predict a future change of services 120. Detector 116 may construct a dynamic correlation topology among services 120 based on the access situation and resource utilization of services 120. Controller 118 may identify associated services correlated with services 120 based on the dynamic correlation topology generated for service 120. In response to a service request exceeding a pre-set threshold, controller 118 may expand services 120 and associated services at the same time.

Figure 4:
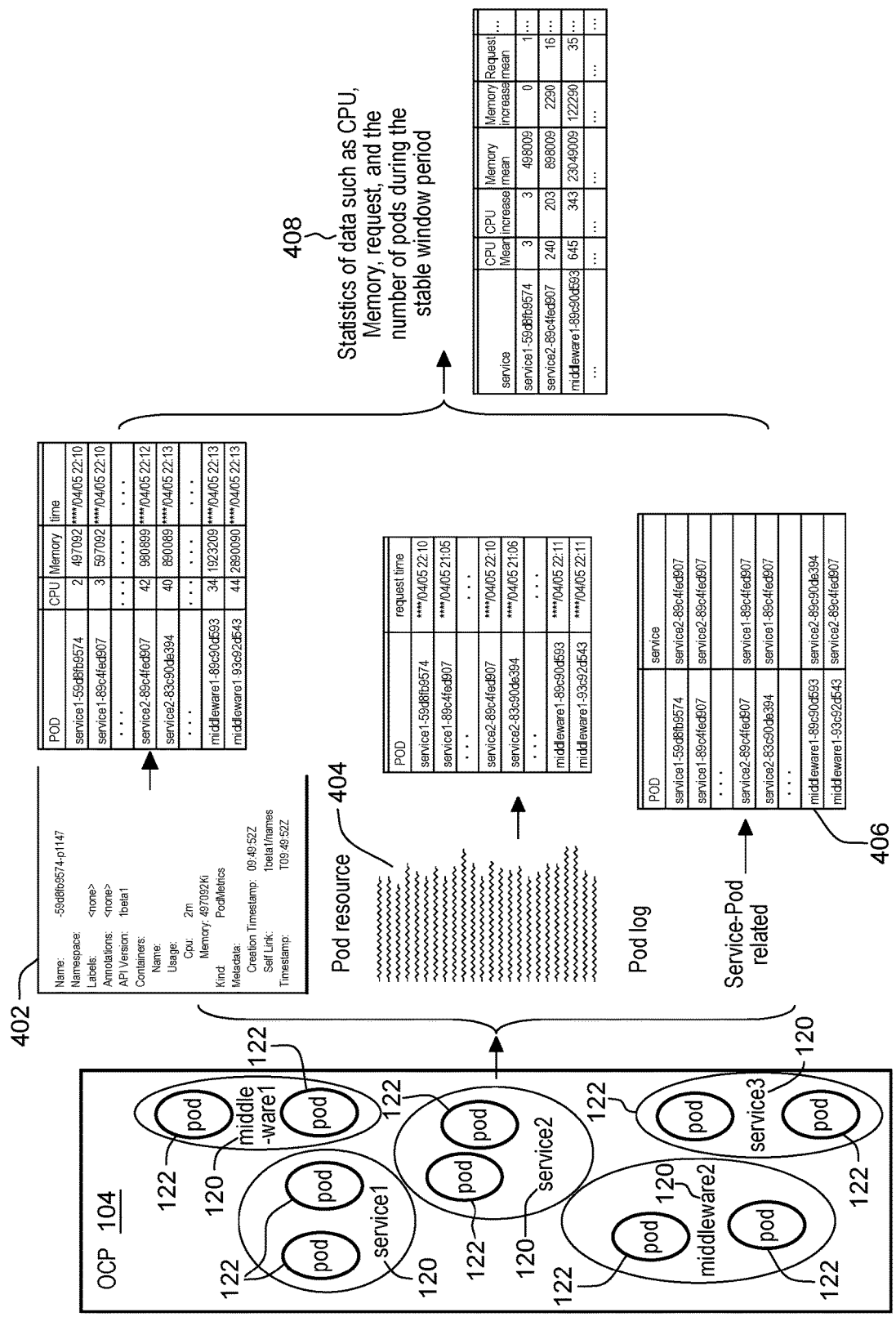
FIG. 4 illustrates an exemplary functional diagram of a collector of the proactive auto-scaling module within the computing device of FIG. 1, in accordance with an embodiment of the present disclosure.

FIG. 4 illustrates an exemplary functional diagram of collector 112 of proactive auto-scaling module 110, in accordance with an embodiment of the present disclosure.

In the example of FIG. 4, collector 112 may collect usage data generated in services 120 in container platform 104. The usage data, for example, can be pod-level resource 402 status of pods 122 and service access status of services 120. The usage data may include service log 404 data. Collector 112 may calculate service level resource utilization 408 based on a corresponding relationship 406 between services 120 and pods 122. Collector 112 may use API 106 provided by container platform 104 to obtain pod metrics (e.g., CPU and memory) regularly. Collector 112 may count pod request time based on the pod's logs. Collector 112 may obtain the average service-level resource utilization based on the correspondence between services 120 and pods 122.

Figure 5:
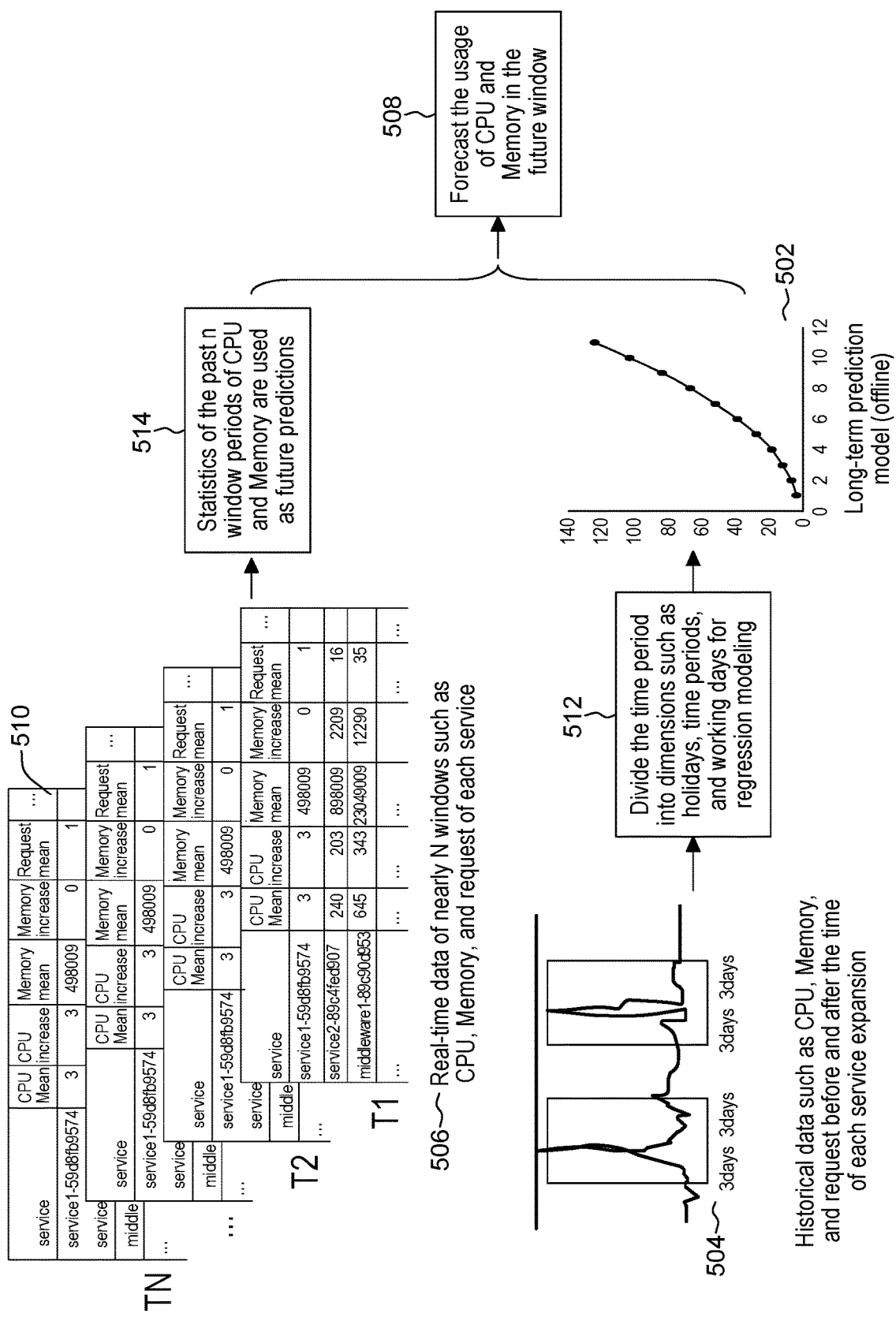
FIG. 5 illustrates an exemplary functional diagram of a predictor of the proactive auto-scaling module within the computing device of FIG. 1, in accordance with an embodiment of the present disclosure.

FIG. 5 illustrates an exemplary functional diagram of predictor 114 of proactive auto-scaling module 110, in accordance with an embodiment of the present disclosure.

In the example of FIG. 5, predictor 114 may predict access situation and resource utilization of services 120 based on the usage data collected from services 120. Predictor 114 may predict service request and resource. Predictor 114 may construct a long-term prediction model 502 based on historical data 504 by statistical analysis of historical data 504 from services 120 and pods 122. Predictor 114 may integrate historical data 504 and short-term real-time data 506 to predict future changes 508 of services 120. In an example, considering that the service request and resource prediction may have a certain periodicity, predictor 114 may use a combination of historical long-term prediction model and short-term fitting. For example, first, the expected value (mean) based on the statistics of first N windows 510 may be used as a predicted value of the next window. Predictor 114 may set forecast period 512 according to a specific period. For example, in a busy holiday season, when the online traffic tends to increase sharply, predictor 114 may set an hourly forecast. On a regular day, predictor 114 may forecast once a day. Predictor 114 may also provide a manual configuration option, which can modify the predicted frequency manually. At the same time, predictor 114 may use statistical analysis 514 of historical data to obtain information on different periods of time and holidays in history to construct long-term prediction model 502. However, due to the sudden and infrequent nature of the expansion, predictor 114 may use short-term data 506 before and after the expansion (such as three days data before and after a special holiday, e.g., when users tend to use internet services sharply) for model construction. Predictor 114 may integrate historical data 504 and short-term real-time data 506 to predict future changes 508 of services 120.

Figure 6:
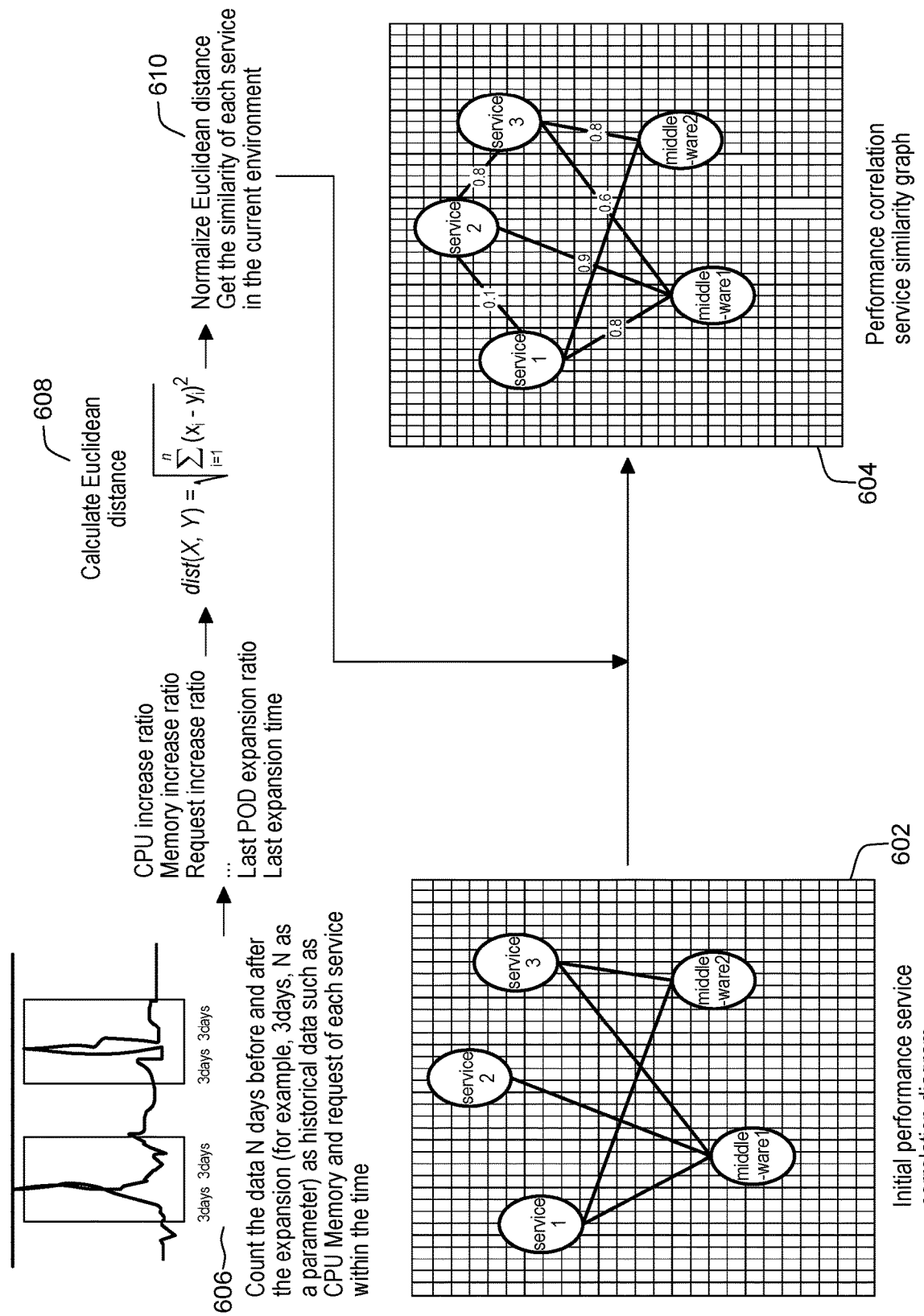
FIG. 6 illustrates an exemplary functional diagram of a detector of the proactive auto-scaling module within the computing device of FIG. 1, in accordance with an embodiment of the present disclosure.

FIG. 6 illustrates an exemplary functional diagram of detector 116 of proactive auto-scaling module 110, in accordance with an embodiment of the present disclosure.

In the example of FIG. 6, detector 116 may construct dynamic correlation topology 604 among services 120 based on the access situation and resource utilization of services 120. Detector 116 may build initial network graph 602 based on prior knowledge of experts. Detector 116 may perform statistics analysis on a node change of initial network graph 602. Detector 116 may obtain dynamic correlation topology 604 based on similarity correlation of nodes in initial network graph 602. Detector 116 may select short-term data before and after a time point 606 when a historical expansion event occurs. Detector 116 may calculate Euclidean distance 608 between each service statistical index. Detector 116 may associate calls between services 120 by normalizing 610 Euclidean distance 608. Detector 116 may achieve an expansion ratio calculation of the associated services through similarity.

Figure 7:
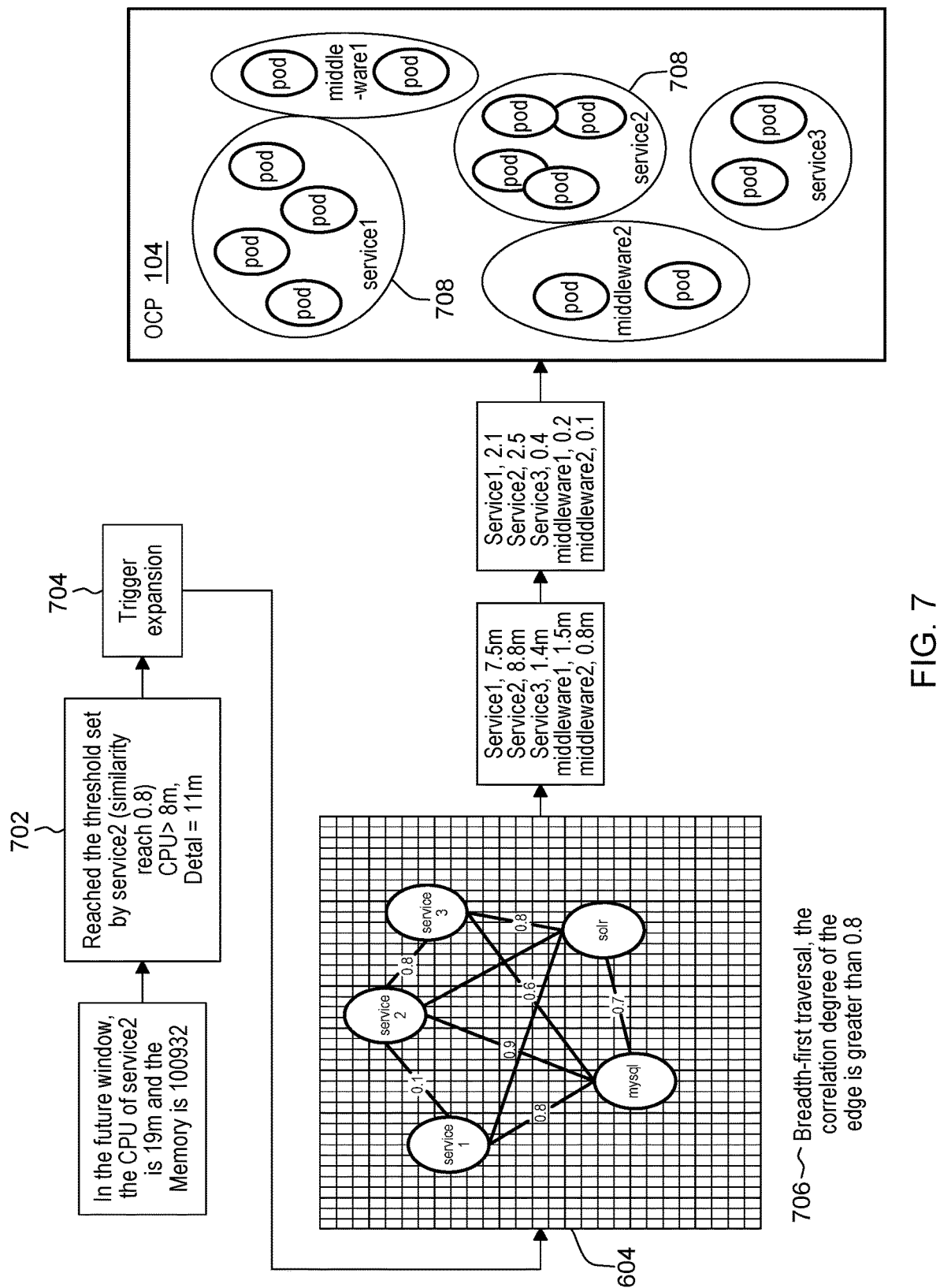
FIG. 7 illustrates an exemplary functional diagram of a controller of the proactive auto-scaling module within the computing device of FIG. 1, in accordance with an embodiment of the present disclosure.

FIG. 7 illustrates an exemplary functional diagram of controller 118 of proactive auto-scaling module 110, in accordance with an embodiment of the present disclosure.

In the example of FIG. 7, controller 118 may identify associated services correlated with services 120 based on dynamic correlation topology 604 generated for service 120. In response to a service request exceeding pre-set threshold 702, in block 704, controller 118 may expand services 120 and associated services at the same time. Controller 118 may use dynamic correlation topology 604 to find the corresponding associated services with services 120. Controller 118 may perform a simulation according to dynamic correlation topology 604 to view a group of the corresponding associated services by an expert. Controller 118 may compare the service request to the preset threshold to determine whether preset threshold 702 is reached. Controller 118 may trigger expansion when the threshold is reached. Controller 118 may determine services 120 with high relevance as a service group for capacity expansion based on dynamic correlation topology 604 and breadth 706 of the dynamic correlation topology. Controller 118 may concurrently call API 106 to expand services and associated services 120 at the same time to complete the advance expansion operation of the service group 708. Controller 118 may use dynamic correlation topology 604 to find its corresponding associated services. Controller 118 may concurrently call an OCP interface (e.g., API 106) to expand services 120 and related services at the same time and to complete the advance expansion operation of service group 708.

Figure 8:
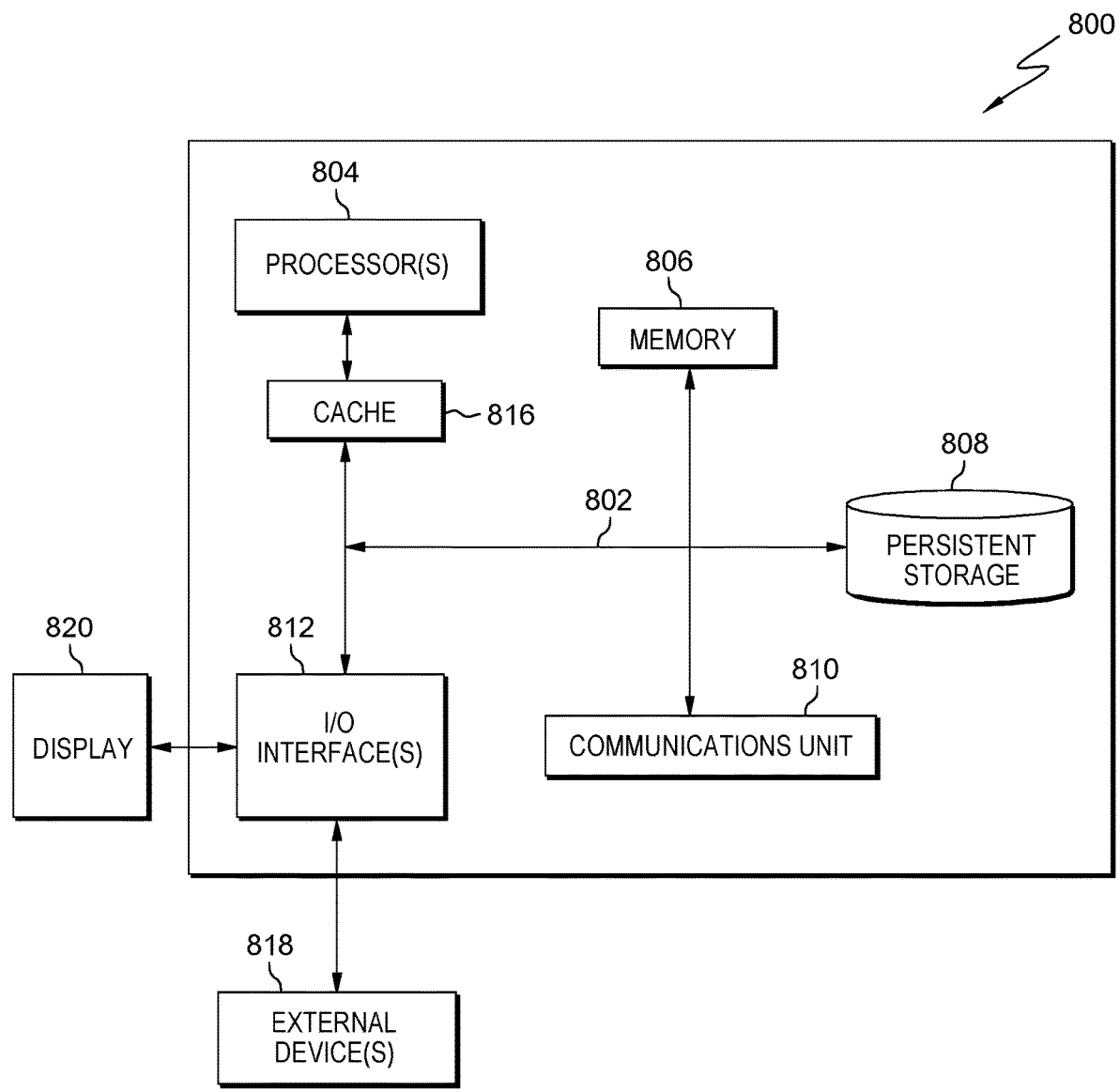
FIG. 8 is a block diagram of components of the computing device of FIG. 1, in accordance with an embodiment of the present disclosure.

FIG. 8 depicts a block diagram 800 of components of computing device 102 in accordance with an illustrative embodiment of the present disclosure. It should be appreciated that FIG. 8 provides only an illustration of one implementation and does not imply any limitations with regard to the environments in which different embodiments may be implemented. Many modifications to the depicted environment may be made.

Computing device 102 may include communications fabric 802, which provides communications between cache 816, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses or a crossbar switch.

Memory 806 and persistent storage 808 are computer readable storage media. In this embodiment, memory 806 includes random access memory (RAM). In general, memory 806 can include any suitable volatile or non-volatile computer readable storage media. Cache 816 is a fast memory that enhances the performance of computer processor(s) 804 by holding recently accessed data, and data near accessed data, from memory 806.

Proactive auto-scaling module 110 may be stored in persistent storage 808 and in memory 806 for execution by one or more of the respective computer processors 804 via cache 816. In an embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices. In these examples, communications unit 810 includes one or more network interface cards. Communications unit 810 may provide communications through the use of either or both physical and wireless communications links. Proactive auto-scaling module 110 may be downloaded to persistent storage 808 through communications unit 810.

I/O interface(s) 812 allows for input and output of data with other devices that may be connected to computing device 102. For example, I/O interface 812 may provide a connection to external devices 818 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present invention, e.g., proactive auto-scaling module 110 can be stored on such portable computer readable storage media and can be loaded onto persistent storage 808 via I/O interface(s) 812. I/O interface(s) 812 also connect to display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
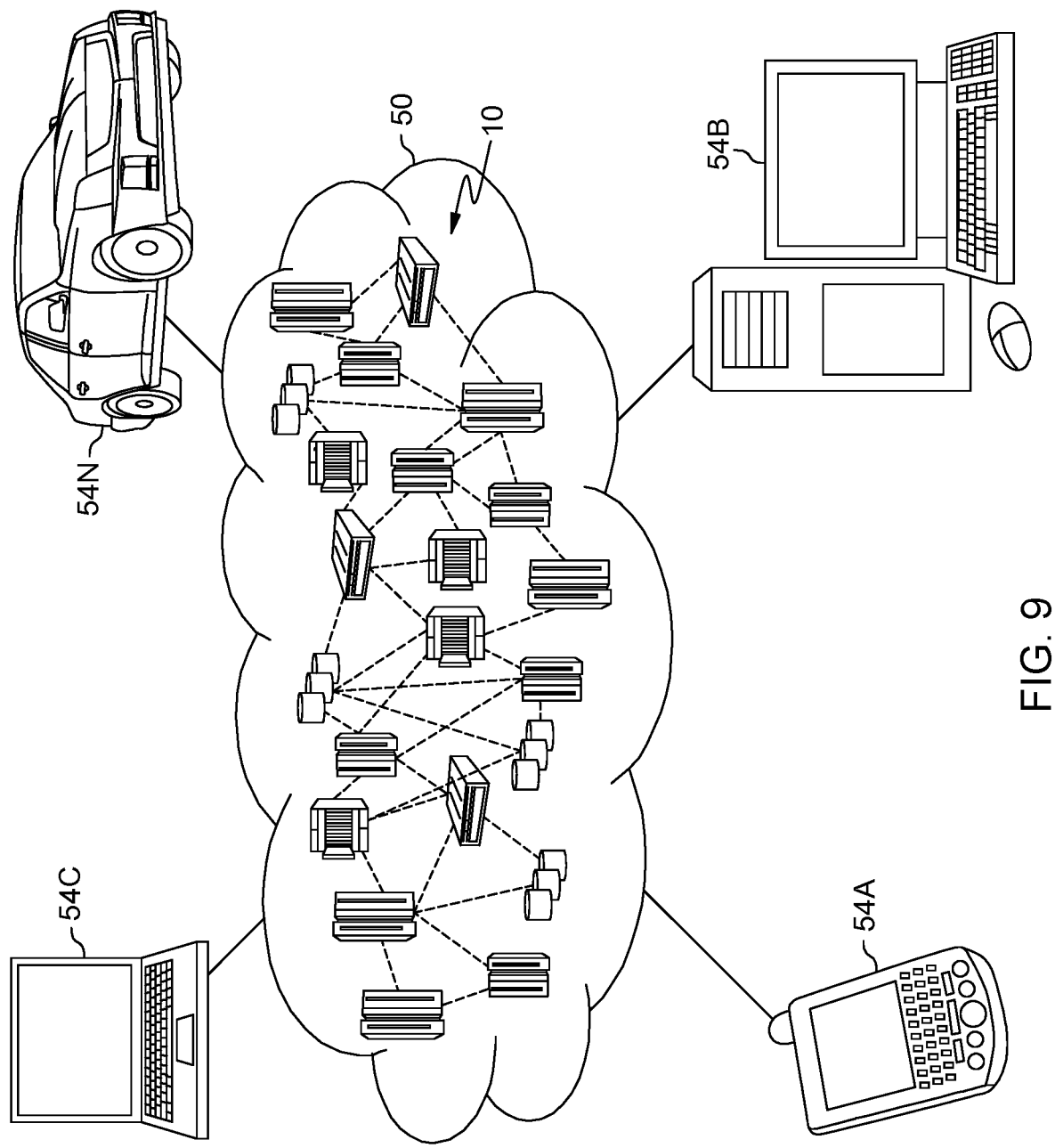
FIG. 9 depicts an embodiment of a cloud computing environment in accordance with the present disclosure.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
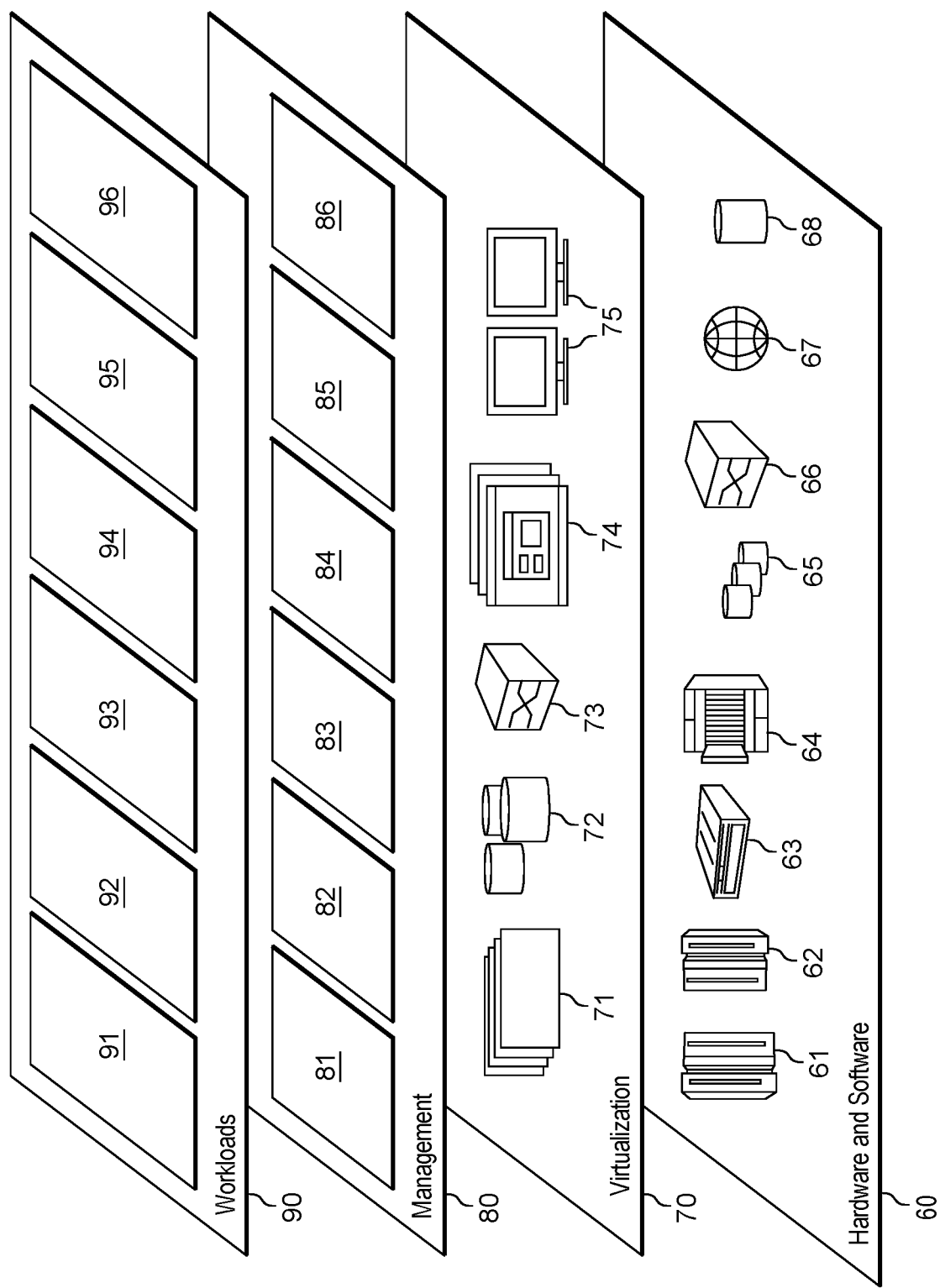
FIG. 10 depicts an embodiment of abstraction model layers of a cloud computing environment, in accordance with the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, proactive auto-scaling module 110 as described above with respect to auto-scaling environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
    collecting, by one or more processors, usage data generated in one or more services in a container platform;
    predicting, by one or more processors, access situation and resource utilization of the one or more services based on the usage data, wherein predicting the access situation and resource utilization comprises:
        constructing a long-term prediction model based on historical data by statistical analysis of the historical data; and
        integrating the historical data and short-term real-time data to predict a future change of the one or more services;
    constructing, by one or more processors, a dynamic correlation topology among the one or more services based on the access situation and resource utilization, wherein constructing the dynamic correlation topology comprises:
        building an initial network graph based on prior knowledge of experts;
        performing statistics analysis on a node change of the initial network graph; and
        obtaining the dynamic correlation topology based on similarity correlation of nodes in the initial network;
    identifying, by one or more processors, associated services correlated with the one or more services to form a service group based on the dynamic correlation topology; and
    in response to a service request exceeding a preset threshold, expanding, by one or more processors, the service group comprising the one or more services and the associated services.

2. The computer-implemented method of claim 1, wherein detecting the dynamic correlation topology comprises:
    selecting short-term data before and after a time point when a historical expansion event occurs;
    calculating a Euclidean distance between each service statistical index;
    associating calls between services by normalizing the Euclidean distance; and
    achieving an expansion ratio calculation of the associated services through similarity.

3. The computer-implemented method of claim 1, wherein identifying the associated services correlated with the one or more services to form the service group comprises:
    using the dynamic correlation topology to find the corresponding associated services with the one or more services;
    performing a simulation according to the dynamic correlation topology to view a group of the corresponding associated services by an expert;
    setting a threshold based on judgment from the expert; and
    estimating an expansion size of the associated services according to a current node expansion.

4. The computer-implemented method of claim 1, wherein expanding the service group comprising the one or more services and the associated services comprises:
    comparing the service request to the preset threshold to determine that the preset threshold is reached;
    triggering the expansion when the preset threshold is reached;
    determining the services with high relevance as the service group for capacity expansion based on the dynamic correlation topology and a breadth of the dynamic correlation topology; and concurrently calling an Application Programing Interface (API) to expand the service group at the same time to complete the advance expansion operation of the service group.

5. A computer-implemented method comprising:

collecting, by one or more processors, usage data generated in one or more services in a container platform;

predicting, by one or more processors, access situation and resource utilization of the one or more services based on the usage data;

constructing, by one or more processors, a dynamic correlation topology among the one or more services based on the access situation and resource utilization, wherein constructing the dynamic correlation topology comprises:

building an initial network graph based on prior knowledge of experts;

performing statistics analysis on a node change of the initial network graph; and obtaining the dynamic correlation topology based on similarity correlation of nodes in the initial network;

identifying, by one or more processors, associated services correlated with the one or more services to form a service group based on the dynamic correlation topology; and in response to a service request exceeding a preset threshold, expanding, by one or more processors, the service group comprising the one or more services and the associated services.

6. The computer-implemented method of claim 5, wherein predicting the access situation and resource utilization comprises:

constructing a long-term prediction model based on historical data by statistical analysis of the historical data; and integrating the historical data and short-term real-time data to predict a future change of the one or more services.

7. The computer-implemented method of claim 5, wherein detecting the dynamic correlation topology comprises:

selecting short-term data before and after a time point when a historical expansion event occurs;

calculating a Euclidean distance between each service statistical index;

associating calls between services by normalizing the Euclidean distance; and achieving an expansion ratio calculation of the associated services through similarity.

8. The computer-implemented method of claim 5, wherein identifying the associated services correlated with the one or more services to form the service group comprises:

using the dynamic correlation topology to find the corresponding associated services with the one or more services;

performing a simulation according to the dynamic correlation topology to view a group of the corresponding associated services by an expert;

setting a threshold based on judgment from the expert; and estimating an expansion size of the associated services according to a current node expansion.

9. The computer-implemented method of claim 5, wherein expanding the service group comprising the one or more services and the associated services comprises:

comparing the service request to the preset threshold to determine that the preset threshold is reached;

triggering the expansion when the preset threshold is reached;

determining the services with high relevance as the service group for capacity expansion based on the dynamic correlation topology and a breadth of the dynamic correlation topology; and concurrently calling an Application Programing Interface (API) to expand the service group at the same time to complete the advance expansion operation of the service group.

10. A computer-implemented method comprising:

collecting, by one or more processors, usage data generated in one or more services in a container platform;

predicting, by one or more processors, access situation and resource utilization of the one or more services based on the usage data;

constructing, by one or more processors, a dynamic correlation topology among the one or more services based on the access situation and resource utilization;

identifying, by one or more processors, associated services correlated with the one or more services to form a service group based on the dynamic correlation topology, wherein identifying the associated services correlated with the one or more services comprises:

using the dynamic correlation topology to find the corresponding associated services with the one or more services;

performing a simulation according to the dynamic correlation topology to view a group of the corresponding associated services by an expert;

setting a threshold based on judgment from the expert; and estimating an expansion size of the associated services according to a current node expansion; and in response to a service request exceeding a preset threshold, expanding, by one or more processors, the service group comprising the one or more services and the associated services.

11. The computer-implemented method of claim 10, wherein predicting the access situation and resource utilization comprises:

constructing a long-term prediction model based on historical data by statistical analysis of the historical data; and integrating the historical data and short-term real-time data to predict a future change of the one or more services.

12. The computer-implemented method of claim 10, wherein constructing the dynamic correlation topology comprises:

building an initial network graph based on prior knowledge of experts;

performing statistics analysis on a node change of the initial network graph; and obtaining the dynamic correlation topology based on similarity correlation of nodes in the initial network.

13. The computer-implemented method of claim 10, wherein detecting the dynamic correlation topology comprises:

selecting short-term data before and after a time point when a historical expansion event occurs;

calculating a Euclidean distance between each service statistical index;

associating calls between services by normalizing the Euclidean distance; and achieving an expansion ratio calculation of the associated services through similarity.

14. The computer-implemented method of claim 10, wherein expanding the service group comprising the one or more services and the associated services comprises:
- comparing the service request to the preset threshold to determine that the preset threshold is reached;
- triggering the expansion when the preset threshold is reached;
- determining the services with high relevance as the service group for capacity expansion based on the dynamic correlation topology and a breadth of the dynamic correlation topology; and
- concurrently calling an Application Programing Interface (API) to expand the service group at the same time to complete the advance expansion operation of the service group.

* * * * *